(No Model.) 2 Sheets—Sheet 1.
F. SUSEMIEHL.
STEEPING TUB FOR STEEPING BARLEY OR OTHER GRAINS.
No. 406,486. Patented July 9, 1889.

Witnesses:
J. N. Rong
Ignatius Schmidt

Inventor:
Fritz Susemiehl
per Wm K White
Attorney.

(No Model.) 2 Sheets—Sheet 2.

F. SUSEMIEHL.
STEEPING TUB FOR STEEPING BARLEY OR OTHER GRAINS.

No. 406,486. Patented July 9, 1889.

Witnesses:
J. N. Long
Ignatius Schmidt

Inventor:
Fritz Susemiehl
per Wm K. White
Attorney.

UNITED STATES PATENT OFFICE.

FRITZ SUSEMIEHL, OF DAVENPORT, IOWA.

STEEPING-TUB FOR STEEPING BARLEY OR OTHER GRAINS.

SPECIFICATION forming part of Letters Patent No. 406,486, dated July 9, 1889.

Application filed June 22, 1888. Serial No. 277,873. (No model.)

*To all whom it may concern:*

Be it known that I, FRITZ SUSEMIEHL, a citizen of the United States, residing at Davenport, in the county of Scott and State of Iowa, have invented a new and useful Steeping-Tub for Steeping Barley or other Grains, of which the following is a specification.

My invention relates to improvements in steeping-tubs for steeping barley and other grain, in which the form of the tub is preferably globular, except at its top, and having a spout or mouth-piece on its upper edge at one side similar in form to those found in pitchers, the water being conveyed into the tub through perforations in exit-tubes in connection with compressed air passed through same by means of an air force-pump, the tub or vessel having a false perforated bottom with trap-door connecting with a conveyer-pipe passing out through the bottom of the vessel; and the objects of my improvements are, first, to permit the barley or other grain and refuse foreign matter floating on top of the water to be discharged from the vessel or tub through its spout or mouth-piece; second, to cause the water to be discharged with great force in the vessel through the perforations in the exit-pipes, to stir and agitate the grain in the vessel, and thus cleansing it from dirt and foreign substances adhering to it; third, to permit the dirt and foreign substances washed off the grain, which sink, to pass through the perforations of false bottom and lie upon the real bottom of the vessel, thus separating the same from the cleansed grain, and, fourth, to provide means for expeditiously removing the cleansed grain, after its proper treatment, from the vessel by means of a trap-door through the false bottom and a conveyer-pipe leading therefrom through the bottom of the vessel. I attain these objects by the mechanism illustrated in the accompanying drawings, in which—

Figure 1:
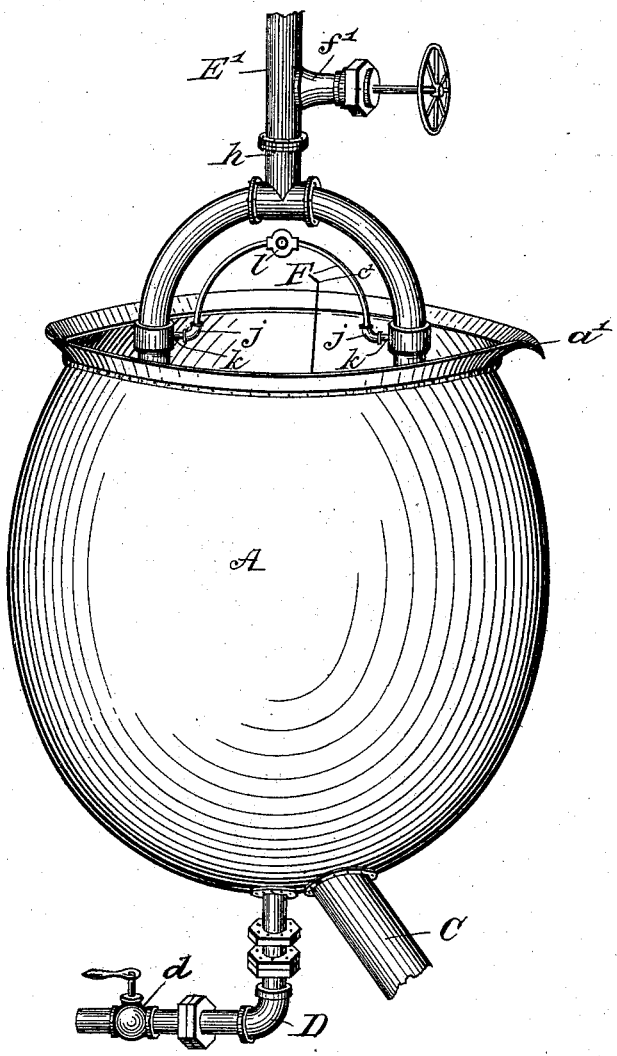
Figure 2:
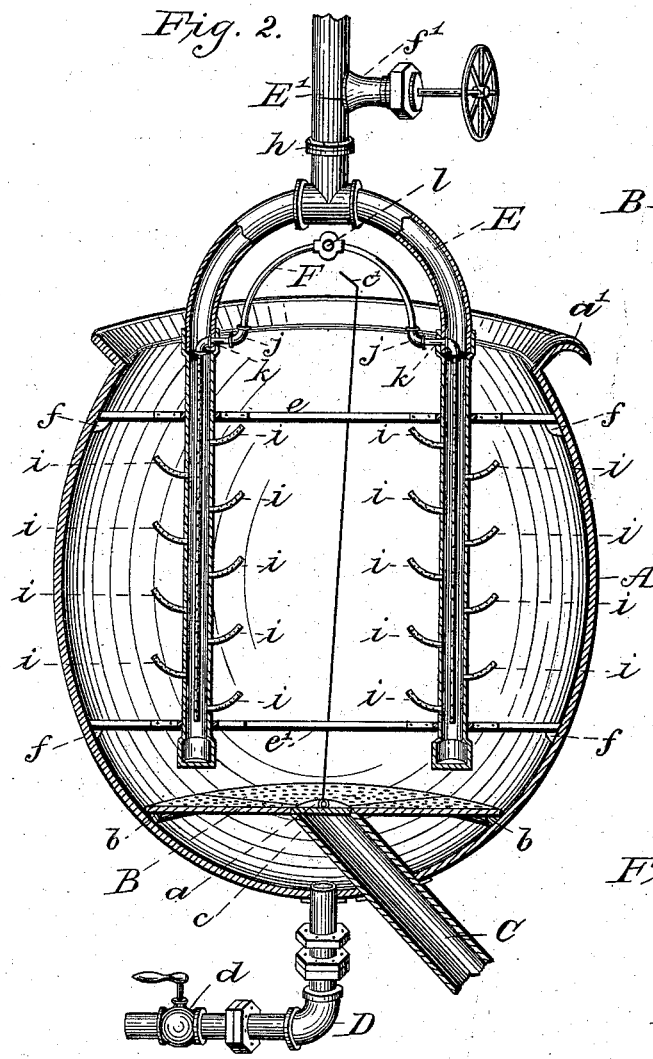
Figure 3:
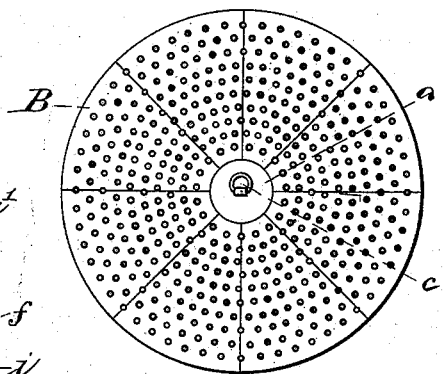
Figure 4:
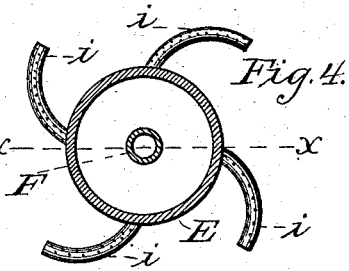
Figure 5:
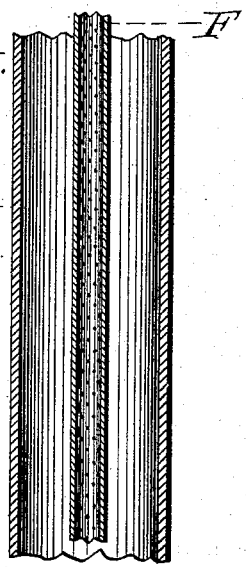
Figure 6:
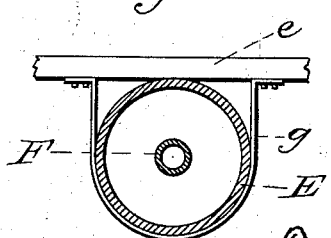

Figure 1 is a front view of the steeping-tub. Fig. 2 is a view of a vertical section of the same. Fig. 3 is a top view of the false bottom. Fig. 4 is a top view of one of the arms of the water and air pipes. Fig. 5 is a vertical section of the same on the line *x x* of Fig. 4, the exit-pipes being removed; and Fig. 6 is a detail view of the means of attaching one of the arms of the water-pipe to the beam in the vessel or tub.

Similar letters or figures refer to similar parts throughout the several views.

A represents the steeping tub or vessel, preferably in form globular, except at its top, and of boiler-iron. At the upper edge of one side is the spout or mouth-piece *a'*, for permitting the overflow of water in the vessel to pass out, as also grain and refuse foreign matter floating upon the water.

B is a perforated false bottom, preferably of boiler-iron, which is supported within the vessel, near its bottom, by the annular rim or projection *b* on the inner side of the vessel. The perforations through said false bottom may be any number desired, but not sufficiently large to permit the grain to pass through.

In the center of false bottom B is a circular opening, its sides beveled so as to receive and hold in position the trap-door *a*, in the upper surface of which is the ring *c*, to which is attached the wire or hook *c'*, for raising up and removing said door. A conveyer-pipe C passes through the bottom of said vessel upward, its mouth terminating just beneath the circular opening in false-bottom B. This pipe is extended to the place desired for emptying or discharging the grain from said vessel after it has been treated.

D is a waste-pipe provided with a cock *d*, and connected with the bottom of said vessel, through which may be drawn off the water and foreign substances at the bottom of said vessel.

E is a U-shaped water-pipe, which is inserted into the vessel and supported by the beams *e e'*, which rest upon and are secured to brackets *f* upon the interior walls of said vessel. The arms or vertical parts of water-pipe E are supported by collars *g*, (shown in Fig. 6,) secured to the beams *e e'*. At the top or oval part of water-pipe E is an opening *h*, to accommodate and make connection with the water-supply pipe E', such supply of water being regulated by the water-cock *f'*. The bottom ends of water-pipe E are closed, and lateral curved exit-pipes *i* are inserted through the sides, preferably extending in a line lengthwise upon four sides of each of the arms or vertical parts of water-pipe E, such number being used as desired, but none extending above the ordinary water-line as used in the vessel. The exit-pipes $i$ are perforated with small holes in such number as desired to permit the passage of water from said water-pipe E to the interior of the vessel.

F is an air-pipe substantially U-shaped, having, however, elbows $j\ j$, which extend through perforations at $k\ k$ in water-pipe E, the joints being made water-tight. At the top or oval part of air-pipe F is an opening $l$, to accommodate and afford connection with another pipe for the purpose of supplying air-pipe F with compressed air by means of an air force-pump.

The pipe conducting or supplying the compressed air from the air force-pump and the air force-pump are not shown in the drawings.

The vertical parts or arms of air-pipe F, extending within the arms of water-pipe E, are perforated with small holes of such number and size as desired, through which the compressed air in the air-pipe F is discharged into the water-space within the water-pipe E. The compressed air so discharged acts upon water supplied to water-pipe E, accelerating its discharge through the exit-pipes $i$, into the vessel, the latter being filled with grain. The velocity of the water causes the grain to move and thoroughly washes and removes from its surface dirt and other foreign substances. The refuse thus washed off from the grain usually sinks, and, reaching the surface of false bottom B, passes through its perforations to the real bottom of the vessel below. Such of the refuse matter as rises to the surface of the water passes with the overflow of water through the mouth or spout $a'$ of tub or vessel A. At such times as deemed proper waste-cock $d$ may be opened and the accumulated refuse matter upon the bottom of the vessel will pass through the waste-pipe D with the water.

After the grain is sufficiently treated, the water drawn off, and the grain sufficiently dried, the trap-door $a$ is removed by means of the wire $c'$ and the grain permitted to fall or slide through said opening and conveyer-pipe C to the place designated for its discharge. Such of the grain still remaining in the vessel may be then shoveled or scraped into said conveyer-pipe. After this the false bottom is removed and the vessel washed out and cleaned. For the purpose of facilitating the drying of the grain after it has been treated the water may be turned off and air forced into the mass of grain alone.

The perforations in the several pipes and the false bottom are shown in the drawings by dots or short lines.

I am aware that it has been proposed to pass water through a mass of grain in a tub from the bottom upward to separate the sound from the unsound grains; that it has also been proposed to pass moistened air through the mass of grain from the top to the bottom. I am also aware that in malting grain it has been proposed to pass through the mass of grain from the bottom to the top water charged with air. I make no claim to such processes, nor do I broadly claim a construction for producing such results, but limit myself to the construction substantially as I have described for producing the results which I stated it would produce. By my construction I accomplish the result of injecting simultaneously separate jets or streams of water into different parts of the mass of grain in the tub, and I use compressed air to accelerate the ejection of the jets or streams of water and cause it to strike the grains with greater energy and force for the purpose of cleansing and agitating such grains.

I am aware that in a steeping-tub for steeping barley and other grain it is old to use therein a false perforated bottom, trap-door, conveyer-pipe, and waste-pipe, and I do not claim such construction; but

What I claim as new, and desire to secure by Letters Patent, is—

In a steeping-tub, the combination of an inverted-U-shaped water-pipe within such tub, its lower ends closed, such pipe having attached to it short laterally-projecting and communicating water-pipes which are perforated, and the interior of such U-shaped water-pipe being also provided with a perforated air-pipe of less diameter and similarly shaped, such air-pipe arranged to be supplied with compressed air and such U-shaped water-pipe with water, for the purposes set forth, and substantially as described.

FRITZ SUSEMIEHL.

Witnesses:
W. C. WARRINER,
IGNATIUS SCHMIDT.